(12) United States Patent
Chow et al.

(10) Patent No.: US 8,020,207 B2
(45) Date of Patent: Sep. 13, 2011

(54) CONTAINMENT MECHANISM FOR POTENTIALLY CONTAMINATED END SYSTEMS

(75) Inventors: Stanley TaiHai Chow, Ottawa (CA); Jean-Marc Robert, Montreal (CA); Kevin McNamee, Ottawa (CA); Douglas Wiemer, Ashton (CA); Bradley Kenneth McFarlane, Ottawa (CA)

(73) Assignee: ALCATEL LUCENT, Paris (FR)

( * ) Notice: Subject to any disclaimer, the term of this patent is extended or adjusted under 35 U.S.C. 154(b) by 1217 days.

(21) Appl. No.: 11/656,434

(22) Filed: Jan. 23, 2007

(65) Prior Publication Data

US 2011/0197278 A1   Aug. 11, 2011

(51) Int. Cl.
*G06F 12/14* (2006.01)
(52) U.S. Cl. ........ 726/22; 726/23; 726/24; 726/25; 726/11; 726/13; 713/194
(58) Field of Classification Search .......... 709/223, 709/224; 726/11, 13, 22–25; 713/194
See application file for complete search history.

(56) References Cited

U.S. PATENT DOCUMENTS

| | | | | |
|---|---|---|---|---|
| 5,170,391 | A * | 12/1992 | Arnold et al. | 370/232 |
| 6,675,209 | B1 * | 1/2004 | Britt | 709/224 |
| 7,490,350 | B1 * | 2/2009 | Murotake et al. | 726/11 |
| 2004/0054925 | A1 | 3/2004 | Etheridge et al. | |
| 2006/0174342 | A1 * | 8/2006 | Zaheer et al. | 726/23 |

FOREIGN PATENT DOCUMENTS

| | | |
|---|---|---|
| WO | WO 2006-081507 | 8/2006 |
| WO | WO 2006-103337 | 10/2006 |

OTHER PUBLICATIONS

Whyte, et al., ARP-based Detection of Scanning Worms Within an Enterprise Network, pp. 1-15.
Whyte, et al., DNS-based Detection of Scanning Worms in an Enterprise Network, Aug. 24, 2004, pp. 1-17.
Oorschot, et al., A monitoring system for detecting repeated packets with applications to computer worms, Int. J. Inf. Secur. (2006) Mar. 8, 2006, Springer-Verlag.
Jiang, et al., An Improved Real-Time Traffic Flow Monitoring Scheme, National University of Singapore.
Mirkovic, J. "D-WARD: Source-End Defense Against Distributed Denial-of-Service Attacks" 2003, XPOO7906244, Unv. of Cali. USA http://lasr.cs.ucla.edu/ddos/dward-thesis.pdf.

* cited by examiner

*Primary Examiner* — Thanhnga B Truong
(74) *Attorney, Agent, or Firm* — Kramer & Amado P.C.

(57) ABSTRACT

A malware detection and response system based on traffic pattern anomalies detection is provided, whereby packets associated with a variety of protocols on each port of a network element are counted distinctly for each direction. Such packets include: ARP requests, TCP/SYN requests and acknowledgements, TCP/RST packets, DNS/NETBEUI name lookups, out-going ICMP packets, UDP packets, etc. When a packet causes an individual count or combination of counts to exceed a threshold, appropriate action is taken. The system can be incorporated into the fast path, that is, the data plane, enabling communications systems such as switches, routers, and DSLAMs to have built-in security at a very low cost.

18 Claims, 3 Drawing Sheets

CONTAINMENT MECHANISM FOR POTENTIALLY CONTAMINATED END SYSTEMS

FIELD OF THE INVENTION

The invention is directed to secure transmissions over communication networks and in particular to a containment mechanism for potentially contaminated end systems of a communication network.

BACKGROUND OF THE INVENTION

Security is a critical feature in modern communication network; providing a security solution requires an understanding of possible threat scenarios and their related requirements. Network security systems need also to be flexible, promoting inter-operability and collaboration across domains of administration.

As the communication networks expand and converge into an integrated global system, open protocol standards are being developed and adopted with a view to enable flexibility and universality of access to collection and exchange of information. Unfortunately, these open standards tend to make networks more vulnerable to security related attacks; TCP (transmission control protocol), was designed on the basis that system users would connect to the network for strictly legitimate purposes, so that no particular consideration was given to security issues. As many routing protocols rely on TCP (for example, border gateway protocol BGP uses TCP as its transport protocol) this makes them vulnerable to all security weaknesses of the TCP protocol itself.

There are many types of security concerns that must be considered in a network. This invention is concerned with detecting systems infected with worm(s). A worm is a program that replicates itself across a network in various ways, where the victim is not usually specifically targeted, but simply an unlucky host. The worms operate by exploiting both known and previously unknown software vulnerabilities and propagate rapidly across the network. By hijacking trusted applications such as web servers, mail transfer agents and log-in servers, which typically run with elevated privileges, worms can gain full access to system resources, and cause complete system compromise. Even though the impact of a worm on any given piece of network equipment is very often benign, the cumulative effects of tens of thousands of infected network elements spreading as fast as possible the malware to other network elements can be disastrous. Worms, especially the fast spreading "flash worms", have wreaked havoc on the Internet; for example Code Red and Nimda caused major congestions in the Internet, in many cases requiring shutting down the entire network of many enterprises.

The reliability and security of an IP network is essential in a world where computer networks are a key element in intra-entity and inter-entity communications and transactions. While the current defense models have been around for years, to date none have been able to deliver on the final goal of providing full protection against all attacks with little associated cost and annoyance. The actual intrusion detection technology does not give the appropriate performance level required for high-end routers. To address this problem, new techniques are being currently devised. This is a key challenge for the telecom industry and many partial solutions have been proposed so far. The capacity to detect as fast as possible the propagation of worms, and to react efficiently to ongoing attacks in order to protect the network infrastructure is becoming a real challenge for network operators, particularly in the case of large distributed networks.

Attack detection methodology can be divided into two main categories: flow-based analysis and deep-packet analysis. Flow-based analysis is based on monitoring the traffic in the telecommunication infrastructure to detect unusual traffic patterns. It relies usually on technologies as Nefflow, IPFix, and Realtime Traffic Flow Monitoring (RTFM: http://www.auckland.ac.nz/net/Internet/rtfm/) implemented into the network routers. Deep-packet analysis methodology is based on tracking back single malicious IP packets by analyzing each packet to detect either known signatures or frequently seen patterns. The methods for tracking continuous flows may also be used to track-back single packets, such as iTrace.

Most flow-based analysis methods are based on statistical detection of anomalous traffic patterns. For example, ConSentry Networks uses a complex ASIC to handle statistical analysis of the traffic. Orcaflow product by Cetasea Networks uses statistics gathered from standard MIBs to find deviation from baseline, ProCurve Swithe by HP implements a connection rate limit, etc.

Other statistical techniques proposed for detecting attacks is "Sequential Hypothesis Testing". While this approach has a fast reaction time, it requires determining whether each connection request succeeded or not. Other techniques propose monitoring different characteristics of worms, such as identifying identical (repeated) packets, or identifying a malicious packet based on absence of a DNS (domain name server) look-up, or assigning scores to packets based on e.g. the peer list, ARP (address resolution protocol) rate, internal network dark space, etc.

Ideally, a network operator strives to identify fast an infected machine and quarantine it as soon as possible; otherwise, the infection could well spread before any alarm is raised. However, the price to pay for detecting and preventing security attacks is overwhelming. Today, enterprises deploy a layered defense model, which includes firewalls, anti-virus systems, access management and intrusion detections systems (IDS). Besides being expensive, the solutions available so far do not detect and stop the spread of worm propagation across a network fast enough. Responsiveness is impacted by the fact that the current solutions are based on multiple components, which may have problems to communicate and coordinate the required counter-measures.

Monitoring and analysis of all packets going through high-end routers requires specialized hardware or additional equipment coupled with the routers, increasing the complexity and the cost of the infrastructure. Even so, it may still have effectiveness problems. The solutions based on recognizing the signature of an attack are quite inefficient, since these solutions have a large response time, always lagging new worms by days. Also, it is difficult to set appropriate limits to the number of connected hosts for defining an attack:[DW1] some servers legitimately talk to many hosts and some clients also talk to many hosts—for example, some web pages, like e.g. www.cnn.com, are complex and talk to dozens of hosts, so it is difficult to minimize both false positives and false negative.

Furthermore, it is extremely difficult to distinguish between the identity, or behavior of 'good' and 'bad' code. This results in a large number of 'false positives' that limit the purpose of many prevention systems to detecting events rather than protecting against them.

Traffic pattern anomaly detection provides a promising solution to detecting worms. Most approaches to traffic pattern anomaly detection are done with statistics of some sort and they can be classified into two main approaches—comparison vs behavior. In the comparison approaches, the plan is to establish a baseline characteristic of the respective flow and then to detect deviations from the baseline. Clearly, this approach cannot have a very fast detection time and is not ideally suited for worm detection.

The existing behavior approaches try to identify worm-like behaviors and try to identify hosts that exhibit any of these behaviors. There are several major drawbacks of the current behavior detection methods. All the existing products incorporate the worm behavior detection functions into high-performance ASIC parts in stand-alone switches. Individual network traffic (or 'pipe') is aggregated towards the high-performance ASIC making it an even more complex problem to separate out each host or port. Also, the speed of the aggregated pipe is likely to be higher than that of the individual pipes, so the aggregate CPU cycles needed, can be very high. The behavioral detection systems are more likely to be placed towards the core of the network, so local traffic will not be "seen" by the system. This means that an infected host could infect a whole workgroup without causing any alarms. Installing additional detection systems in the network will result in more delay for each packet, and will also increases management, etc.

In summary, this complex processing used by the current behavior approaches cannot be done at the fast data-path; any action taken by the existing behavioral detection systems is necessarily delayed. Any delay is nonetheless undesirable: in this context, any packet that gets through translates to potentially another infected machine.

Therefore, there is a need to provide new techniques and systems for detecting and confining malicious activities (e.g. internet worms) in a network that are easy to install and maintain.

SUMMARY OF THE INVENTION

It is an object of the invention to provide a detection and response mechanism for potentially contaminated end systems of a communication network.

Accordingly, the invention provides a malware detection and response system for a network element connected at the edge of a communication network, comprising: a header data processing unit for examining header data of each protocol data unit seen on a port of the network element and identifying a PDU type; a counters unit for providing a plurality of count values for each traffic direction based on the PDU type; means for storing a limits table setting a corresponding limit for each the count value and a rules set for defining attack patterns and containment actions for the port; and an attack identification and containment unit for identifying a type of attack based on the count values, limits table and rules set, and for initiating a defense action for containing the type of attack.

The invention also provides a method for malware detection and containment for a port of a network element connected at the edge of a communication network, comprising the steps of: i) examining header data of each protocol data unit (PDU) seen on the port for determining a PDU type of each the PDU; ii) maintaining for each traffic direction a plurality of counters for providing count values based on the PDU type; iii) providing a limits table with preset limits corresponding to each count value and a rules set for defining attack patterns and containment action for the port; and iv) identifying a type of attack based on the count values, limits table and rules set.

The malware detection and response system according to the invention enables defending a communication network against worms while avoiding all the complicated processing implemented to this end in most current networks. Since the malware detection and response system does not require development of signature definitions for each new worm, implementation and use of this system does not depend on constant updating of worm signatures and does not require attention from skilled administers. A side advantage of this independence from worm signatures is that attackers are not able to avoid detection by manipulating the traffic signature result.

Another advantage of the malware detection and response system according to the invention is that it can be built into every port of edge switches without needing special hardware. The system of the invention can be incorporated into the "fast path", that is, the data plane, enabling communications systems such as switches, routers, and access/edge equipment to have built-in security at a very low cost.

Most importantly, the invention provides a containment mechanism that uses a combined detection and response for enabling early alerts without the problems of false-positive alerts, and which is capable of managing and setting easily limits for individual hosts.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

The invention provides a malware detection and response (MDR) system that may be easily integrated into the hardware of existing network equipment, and preferably at the edge devices of the network. As an example, the malware detection system may be incorporated into, but not limited to, a network switch, or into the Intelligent Service Access Manager (ISAM), the Digital Subscriber Line Access Multiplexer (D-SLAM), or even the Asymmetric Digital Subscriber Line (ASDL) modem. The network elements listed above by way of example belong to a product family that enables a telecommunications equipment vendor to provide a next generation access network ready for massive triple play (3P) deployments, in term of bandwidth, service intelligence, IP/Ethernet features and scalability. Thus, the ISAM is a wire-speed IP DSLAM, tailored for non-blocking 3P services delivery; the D-SLAM is a DSL (digital subscriber line) access multiplexer that operates into an IP/Ethernet aggregation network; and ADSL supports high-speed data communications on top of traditional telephone service on a single telephone access line, for transforming an operator's existing copper twisted pair investment into a multimedia broadband distribution system.

Figure 1:
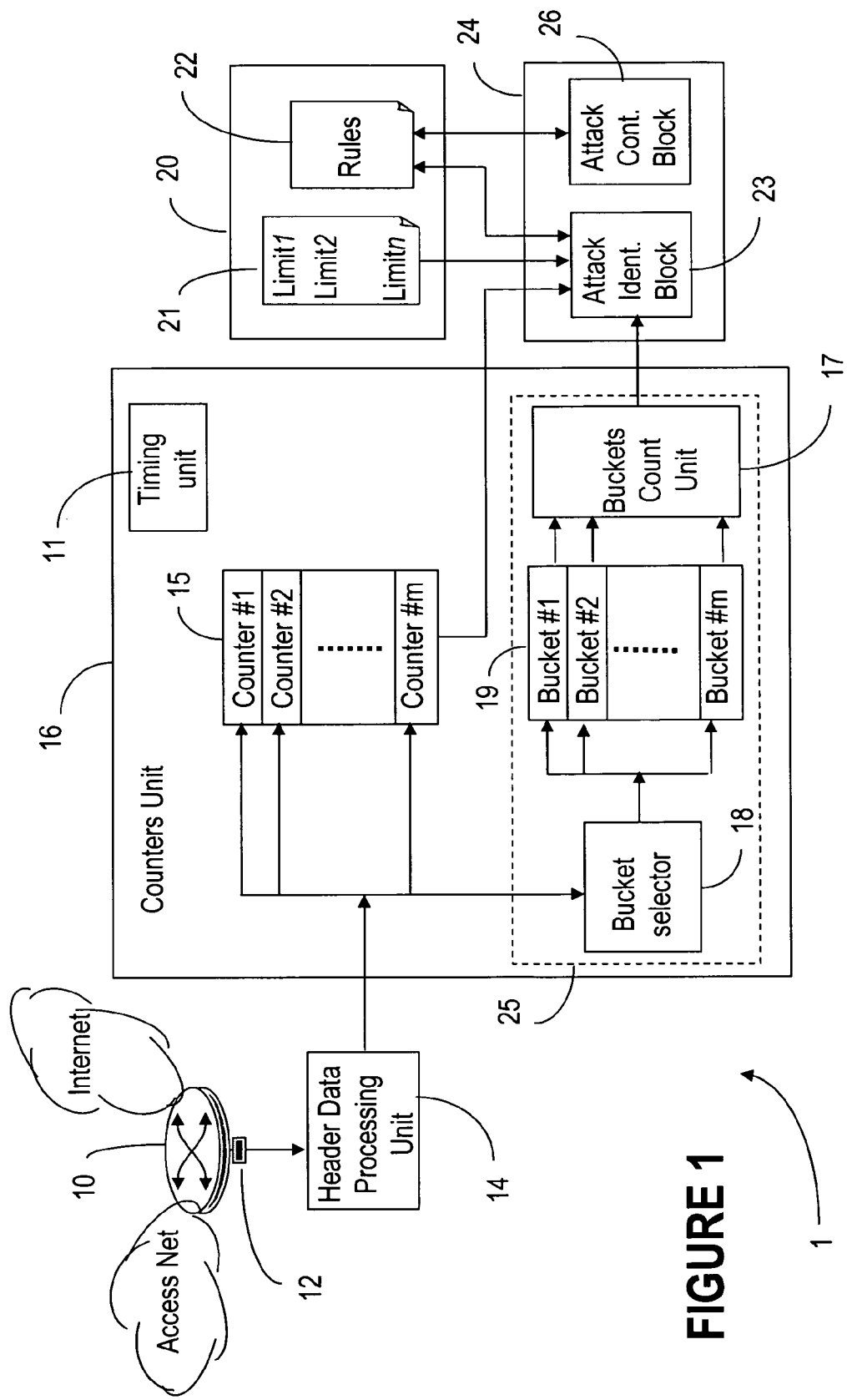
FIG. 1 illustrates the block diagram of the malware detection and response (MDR) system according to an embodiment of the invention.

FIG. 1 shows the block diagram of the malware detection and response (MDR) system 1 according to the invention. This figure shows generically a network element (NE) 10 with a port 12; NE 10 is connected in this example at the border between an access network and the Internet. In this specification, units through which digital data is transmitted from one point to another over a communication line are referred to generically as Protocol Data Units (PDU's). This term includes data units formatted according to various transmission protocols; PDU's can be IP packets, TCP packets, frames, etc. generated according to a respective transmission protocol.

The PDU's can be for example ARP requests, TCP/SYN requests and acknowledgements, TCP/RST packets, DNS/NETBEUI name lookups, out-going ICMP packets, UDP packets, etc. In these examples, Address Resolution Protocol (ARP) is a TCP/IP protocol used to convert an IP address used on the transport network into a physical address such as an Ethernet address used on a LAN/MAN/WLAN. ARP requests and responses may be present on port 12 if the NE uses) ARP. In this case, when the NE wishes to obtain a physical address of a host on the access network, it broadcasts an ARP request onto the access network. The host on the access network that has the IP address in the request then replies with its physical address. There is also Reverse ARP (RARP) used by a host to discover its IP address. In this case, the host broadcasts its physical address and a RARP server replies with the host's IP address.

NE 10 may also use IP/TCP. It is known that in order to establish a connection, TCP uses a "3-way handshake", by exchanging packets of a specific type. The Internet Protocol header carries several information fields, including the source and destination host address information. The header also includes 6 control bits (or flags) that are set according to the packet type. A SYN flag is set in a packet during the three-way handshake, and is used to synchronize sequence numbers of the packets in the respective flow. When a normal TCP connection starts, a destination host receives a SYN (synchronize/start) packet from a source host and sends back a SYN ACK (synchronize acknowledge). The destination host must then hear an ACK (acknowledge) of the SYN ACK before the connection is established.

When an end-point of a TCP connection wishes to stop its half of the connection, it transmits a FIN packet, which the other end acknowledges with a FIN/ACK. A FIN flag is set in a packet during the graceful teardown of an existing connection, and is used to indicate that there is no more data from sender. RST flag is set to request reset of a connection. A typical connection teardown requires a pair of FIN and FIN/ACK segments from each TCP endpoint.

Other types of PDU on port 12 may use Domain Name Systems (DNS) for translating names of network nodes into addresses. Network Basic Input/Output System (NetBIOS) is a transport protocol, connecting network hardware with the network operating system; it enables lookups in the DNS. NetBios Extended User Interface (NETBEUI) is an enhanced version of the NetBIOS protocol used by network operating systems such as LAN Manager, LAN Server, Windows for Workgroups, and Windows NT.

Returning now to FIG. 1, the MDR system 1 of the invention monitors the PDU's arriving on port 12. The monitoring may be performed on selected ports or on all ports of a NE; FIG. 1 shows only port 12 by way of example. In broadest terms, system 1 includes a header data processing unit 14, a counters unit 16, storing means for limits table 20, an attack identification and containment (AIC) unit 24, and a timing unit 11.

Header data processing unit 14 monitors the PDU's seen on the port 12 and examines the data in various fields of the PDU's header with a view to determine the PDU type with a view to establish which counter of the counters unit 16 should be updated. The "type" of a PDU is established based on the information in the header and identifies an action initiated by the PDU. Examples of PDU types are, SYN_in, ARP_query_in, etc. For example, the SYN_in packets are identified by examining if the respective flag is set in the header of an incoming IP/TCP packet. Unit 14 monitors the header in both the incoming and outgoing directions; the term "seen" refers in this specification to the PDUs that arrive on port 12 from far-end hosts (incoming PDU's), or to the PDU's that are transmitted from port 12 to far-end hosts (outgoing PDU's). It is to be noted that the term "traffic direction" is used to identify the "outgoing" and "incoming" PDU's. The terms "outgoing" and "incoming" are used here relative to the port 12 of the network element 10.

Header data processing unit 14 can be built in hardware, in which case it can comprise simply a number of comparators for each bit position of interest in the PDU header. A hardware based solution could also use a content addressable memory (CAM) to detect the specific fields in the packet header. Alternatively, a simple software module can be used to test the respective fields in the header. Other alternatives will be evident for persons skilled in the art.

Counters unit 16 includes a plurality of counters 15, also referred to as simple counters, and a complex counters unit 25. Complex counters unit 25 is preferably used in more sophisticated implementations of system 1 for determining the number of far-end hosts, as described later. It is to be noted that there can be multiple "complex counters" 25, for each port that is to be protected.

The content of a counter 15 is referred to in this specification using the term "count value". Each counter 15 is associated with a particular type of PDU and is incremented when the corresponding PDU is detected. As such, each PDU seen on port 12 updates zero, one or more of the counters; the number (and implicitly the types) of counters 15 is a design parameter that depends on the type of information that is to be collected at the respective port. Thus, NE 10 may be equipped with ARP counters for counting the ARP requests (queries) and responses, respectively: an ARP_query_in packet will update an ARP_query_in counter 15, an ARP_response_out packet will update the ARP ARP_response_out counter, etc. More information of the traffic is obtained when the port is provided with a complex counter unit 25, which enables counting the number of far-end hosts. In this case, for outgoing ARP requests, a counter 15 counts the total number of ARP requests and unit 25 determines the number of different hosts mentioned in the requests. Similarly, for the incoming ARP responses, the counters count the total number of ARP responses, the number of different hosts responding and the number of responding hosts mentioned in outgoing ARP requests.

TCP counters 15 may also be used for the SYN and SYN/ACK packets. Now, for outgoing SYN requests, the TCP counters count the total number of SYN requests sent, the number of distinct far-end hosts and the number of distinct far-end host and port number pairs. For incoming TCP SYN/ACK acknowledgements, a counter 15 counts the total number of SYN/ACK received, and complex counters unit 25 determines the number of distinct far-end hosts, the number of distinct far-end host and port number pairs, and the number from hosts/ports that match the host in out-going SYN packets.

In a similar way, for the incoming RST packets, a counter 15 count the total number of RST packets received, and unit 25 counts the number of distinct far-end hosts, the number of distinct far-end host and port number pairs, and the number of hosts/ports that match the host in out-going SYN packets. For other connection types (non ARP, etc) the counters count the total number of outgoing broadcasts.

DNS Counters 15 may also be used for obtaining statistics on DNS/NETBEUI lookups. For the outgoing DNS/NETBEUI lookups, the system of the invention counts the total number of lookups and the number of distinct names looked up for the incoming requests. For incoming DNS/NETBEUI lookups, the system counts the number of successful lookups, the number of failed lookups and the number of intermediate results, which are DNS queries that result in a forwarding to another DNS server.

Counters may also be used for counting each type of outgoing ICMP packet. Internet Control Message Protocol (ICMP) is an extension to the Internet Protocol (IP), which supports packets containing error, control, and informational messages.

As well, UPD packets may be counted in designated UPD counters. The User Datagram Protocol (UDP) is a minimal, datagram-oriented, transport network protocol above the IP network layer that does not guarantee data ordering or delivery. Because it is datagram oriented, each send operation by the application results in the transmission of a single IP datagram. This mode of operation contrasts with the TCP, which is byte stream oriented and guarantees the delivery and ordering of the bytes sent. In one embodiment of the invention, the UDP counters for outgoing UDP packets count the total number of packets sent, the number of distinct far-end hosts and the number of distinct far-end host and port number pairs. For the incoming UDP packets, the counters keep track of the total number of packets received, the number of distinct far-end hosts, the number of distinct far-end host and port number pairs and the number from hosts/ports that match the host in out-going UDP packets.

It is to be noted that the above list of counters 15 is not exhaustive. Table 1 provides the types of counters used in an experimental embodiment of the invention. As indicated above, the terms incoming (in) and outgoing (out) are used relatively to port 12.

TABLE 1

| PDU type | Counter type (counted feature) |
|---|---|
| ARP_query_in | # of sources in the local subnet |
| ARP_query_out | # of intended destinations in the local subset |
| ARP_response_in | # of intended destinations in the local subnet that actually exist |
| ARP_response_out | # of times we answered sources in the local subnet |
| SYN_in | # of attempted in-coming TCP connections |
| SYN_out | # of attempted out-going TCP connections |
| SYNACK_in | # of attempted out-going TCP connections that the destination accepted |
| SYNACK_out | # of attempted incoming TCP connections that the host accepted |
| FIN_in | # of in-coming scans (not really used) |
| FIN_out | # of out-going scans |
| FINACK_in | # of in-coming socket-closes |
| FINACK_out | # of out-going socket-closes |
| RST_in | # of in-coming resets |
| Unreachable_in | # of times destination not reachable (for any reason) |

It is to be noted that even though the list of counters is very long, each packet can only be of one protocol TCP, ARP, UDP, etc, so the work per packet amounts to a few tests to determine the type of packet and then increment a few counters for the respective protocol.

MDR system 20 maintains limits table 21 stored in any suitable memory available at the network element; this is generically shown by storing means 20. Limits table 21 maintain individual limits for each counter, as well as composite limits for groups of counters that involve performing some simple operation on the count value in a number of counters. Table 20 also stores a rules set 22 defining attacks and containment actions for the respective attack. The rules in set 22 are configurable for each port with a view to detect anomalous traffic patterns, having in view the known patterns for the legitimate traffic, etc. Another variant of the limits table 21 is to keep probabilistic limits, whereby the counters track the count values and the limits are pre-converted to a probabilistic value.

Preferably, the limits are set or changed by the NMS (network management system) or the OSS (operation support system) of the respective network (not shown). Since most networks use DHCP to assign IP addresses, the NMS can immediately download a set of boundaries tailored for the class of hosts. This can be a function of the host MAC address, physical port, VLAN assignment, or any other local characteristics.

Dynamic limits in conjunction with distinct containment actions (or responses) may also be envisaged. For example, it is possible to initially set the boundaries for certain counter 15 to be tight, and to respond with a containment action for these boundaries that only slows-down the port when the boundary is triggered, rather than shutting it down. In this way, the NE gets an early alert of a possible attack being under way, without overly annoying the user/s. When specific counters trigger alerts, the response could be to automatically loosen the limits. This type of response is useful during initial setup to adaptively set limits for servers, etc.

The attack identification and containment unit 24 comprises an attack identification block 23 for identifying an attack, and an attack containment unit 26 which triggers an appropriate defensive action based on the attack type. Thus, block 23 calculates composite count value from individual count values as needed and compares the individual and composite count values against the corresponding individual and composite limits. If one or more limits are crossed, block 23 identifies a probable type of attack based on the rules in rules set 22. If NE 10 is equipped with a complex counters unit 25, attack identification block 23 identifies an attack by correlating the limits that were crossed for individual/composite count values provided by counters 15 and the number of far-end hosts provided by complex counters unit 25. In short, if the count value in one or more counters crosses a limit/threshold, unit 24 identifies in rules 22 the particular rules disobeyed by the respective traffic flow on port 12.

Once the type of attack has been identified, attack containment block 26 triggers a certain defensive action, again based on rules in rules set 22. Ideally, attack identification and containment unit 24 should check the limits each time a counter is changed. While this mode of operation gives the fastest response time, it requires processing power in the data-path. Preferably, a time window TW is set for each counter according to the type of the respective counter. Most counters 15 may use a very short time window, e.g. 5 seconds. For example, the ARP failures counter is a pretty unambiguous indicator of scanning of the local subnet, so it should trigger its limit immediately. Other counters are more statistical in nature, so a longer interval—say thirty seconds, is reasonable. For example, the counters for the TCP/IP packets need longer windows since the duration of a connection may extend over longer periods of time, etc.

Table 2 gives examples of different rules used by the MDR system 1, and provides the rule name, the time window for assessing compliance with the limit set for the respective rule, the individual/composite count value relevant to the respective rule (and how the composite value is obtained), the limit for the rule and the (probable) attack type. Examples of individual count values are ARP_query_out that indicates the number of peers on a local subnet, and the RST_in that indicates the number of RST packets received by port 12. An example of a composite count value is SYN_out−SYN-ACK_in, which indicates the number of outgoing attempts that fail.

TABLE 2

| Rule Name | TW | Count Value | Limit | Attack Type |
|---|---|---|---|---|
| ARP_failure | 5 | ARP_query_out − ARP_response_in | >1 | # of times the host tried to talk to non-existent peers in the same subnet. |
| ARP_poison | 5 | ARP_response_out − ARP_query_in | >1 | # of un-solicited ARP responses from the host, typically ARP poisoning attempts |
| ARP_count | 30 | ARP_query_out | >10 | # of peers on local subnet |
| SYN_failure | 30 | SYN_out − SYNACK_in | See a | # of outgoing attempts that fail |
| SYNACK_scan | 30 | SYNACK_out − SYN_in | See b | Too many outgoing SYNACK, probably scan |
| FIN_scan | 5 | FIN_out | >1 | # of out-going FIN scan |
| FINACK_diff | 30 | FINACK_out − FINACK_in | See c | Mismatch of FIN + ACK count for the two directions, possibly XMAS tree scan |
| RST_count | 30 | RST_in | See d | Too many incoming RST |
| Unreachable_count | 30 | Unreachable_in | >20 | Too many incoming destination-unreachables |

In Table 2, the limit for SYN failure denoted with a) provides the number of out-going connections that fail, as calculated from SYN_out−SYNACK_in. During normal usage, almost all outgoing connections succeed. There are some cases where a lot of outgoing connections fail, such as for example in the case of P2P software where the destination may be turned off. A two-part rule is used for detecting this:

If SYN_out is small, no action taken.
If SYN_out is large (say 10 attempts in 30 seconds), failure rate over 20% is cause for alarm Limit b) is set for indicating a port scan. Normally, the number of ACK outgoing packets occurring in response to incoming SYN packets (SYNACK packets) is expected to be close to the number of the SYN packets. When there are too many outgoing SYNACK packets, it is probably a port scan. A two part test is used:

If SYNACK_out−SYN_in is small, no action
If the difference is >2, a ratio of (SYNACK_out/SYN_in) >0.20 is a port scan.

Limit c) for FINACK_diff indicates a mismatch between the numbers of FINACK packets in the two directions. During normal usage, the two should track very closely, irrespective of which side started the FIN sequence. If the host sends more than it receives, this is an indication of a scan, such as for example the XMAS tree scan with all the flags set. A two part test is used:

If the absolute difference between the incoming and outgoing FINACK packets is small, no action.
If the absolute difference is large (5 more FINACK packets sent than received in 30 seconds), then FINACK_out/FINACK_in or FINACK_in/FINAcK_out>1.2 is cause for alarm.

Limit d) provides the number of incoming RST packets. Each RST packet is possibly the response to a scan attempt, but RST is also used in many legitimate cases, so the trigger is set relatively high, for example 50 RST packets in 30 seconds.

Some examples of rules using an individual limit follow:
If countSYN>100, a worm tries to connect to many hosts;
If countUDPout>100, a worm tries to connect to many hosts with UDP;
If countARP>100 a worm probes the local sub-net.

Examples of rules using a composite limit are given below:
A (countSYN−countSYNACK)/countSYN>0.15 indicates a low percentage completion of TCP;
A (countUDPout−countUDPin)/countUDPout>0.15 indicates a low percentage completion of UDP; or
A (countRST+countICMPnonreachable)>19 indicates that many far-ends refuse to talk or are unreachable.

Still further, composite limits may be set as combinations of above conditions. For example if ((countSYNhosts>50) & (countSYN−countSYNACK>30)) a worm tries to connect too many hosts but only gets through to some.

It is to be noted that not all equipment within a network needs to implement all of the counters, limit and rules provided above. Each implementation may chose some subset depending on the protection required, the memory footprint, the processing powers of the fast data-paths, the processing powers of the slow control-path, and so on.

After all the counting is done, attack identification block 26 checks the count values against the limits in tables 21 and identifies the attack type based on rules 22. Then, attack containment unit 26 can take a number of actions, based on the attack type and its gravity, based on pre-set rules 22:

a. Shut down the port totally, until manually reset. This would be suitable for rules that have very low false-positive.

b. Quarantine the port to a VLAN that is dedicated to remediation only, where virus scanners and other tools can be brought to bear.

c. Quarantine the port to a honeypot VLAN so that the worm can be observed in action d. Shut down the port temporarily; say for 1 second, then for 2 seconds, then for 4 seconds, doubling each time. This is suitable for rules that have fuzzy boundaries when legitimate users may occasionally reach the limit, this action means we only slow down the user at the limits (so legitimate users are not greatly affected) but worms will be slowed down and eventually shut down.

Because the detection is done in the "fast" path, the above actions can be taken immediately, including discarding the very packet that triggered the action. Also, because the detection is performed at the very edge of the network, the action taken is highly specific to a single host, or a small number of hosts connected to a physical port.

As indicated above, counters for each side (far-end and near-end), or for each direction of traffic are kept separately. Keeping separate counts for each direction eliminates the need to match up request/response pairs for each connection, simplifying the malware detection. This eliminates the need to keep a list of the far-end host addresses, which list would consume a lot of memory and CPU cycles. While such lists will enable more accurate malware detection, it is prohibitively expensive to count the number of far ends, to remember and match up each IP/port combination for each packet; the usual methods are rather slow and use too much memory. Providing the physical ports of a switch with the malware detection and response system of the invention, results in determining which port is under attach, without relying on the packets to identify the culprit —; so that free anti-spoofing is obtained.

A more accurate detection can be provided by counting distinct IP addresses of the far-end hosts; these could be just far-end IP addresses or IP address-port combinations. Usual methods of keeping track of far-end hosts would, again, run into CPU and memory limitations. Rather than using lists of addresses for far-end hosts for the incoming PDU's, the system of the invention uses a complex counters unit 25 to keep track of the number of far-end hosts. This technique is much faster than keeping address lists, saves processor cycles and memory at the expense of accuracy. Complex counters unit 25 comprises a plurality of buckets 19, a bucket selector 18 and a buckets counting unit 17. For example, the complex counters unit 25 may be equipped with a set buckets counting unit 17 for each direction of traffic and each protocol type. Preferably, the buckets 19 are provided in the form of an array of a selected size. It is to be noted that while it is desirable to maintain distinct buckets 19 of far-end hosts for each of the PDU categories listed above, it is possible to combine the buckets. There is a lot of value even in the extreme case of using only a single hash table for all incoming and outgoing packets.

The idea is to hash the address data from the fields of the header that identify the far-end host, as generically shown by bucket selector 18. The hash value obtained is then used as an index into array 19, and the bucket (bit) corresponding to the respective hash value is set. Alternatively, a set buckets count unit 17 can count the buckets that are not set (or unset). In this way, each bucket is associated with a certain far-end host address. Buckets counting unit 17 determines how many buckets are set over a certain time TW. The bucket number indicates how many far-end hosts received/transmitted traffic during that time interval. An attack may be for example detected if the number of far-end hosts is suspiciously high.

A bucket is set only once during the time window, using a very simple algorithm. If bucket selector 18 identifies let's say Bucket#, and that bucket has already been set, nothing happens. If, on the other hand, Bucket#has not been set yet, it is set. The pseudo code for bucket updating step is:

```
Declare seen as Boolean[m];     set m buckets
Bucket = hash(IP, port);        hash to find bucket number
If (seen[bucket]);              already seen this bucket, do nothing
else;                           have not see this bucket
   count = count + 1;
   seen[bucket] = true;
endif
```

The obvious way to determine the number of buckets that are set (or unset) is to loop over each bit, or to take each byte and look up a table; both these approaches are fairly slow. On the other hand, the system of the invention uses an algorithm that basically treats each bit as an individual number and sums pair in parallel. With this approach, it takes around a dozen instructions to count the number of bits set in a 32-bit word.

Preferably, bits that are hashed are the IP address bits of the packet, or the IP address bits and the port number bits; we refer to this data in the following as address data. In one experimental embodiment of the invention the buckets were implemented on a bit array of 256 bits (m=256) and the hash function selected reduced this number to 8 bits. Since the IP address space is 32 bits, for an 8-bit hash, there is a choice of $2^{24}$ combinations in the same bucket. In other words, $2^{24}$ address data may set the same bucket. This means that an attacker could attempt to avoid the triggers by talking to hosts/ports that fall into the same bucket in order to keep the number of far-end hosts low.

Figure 2A:
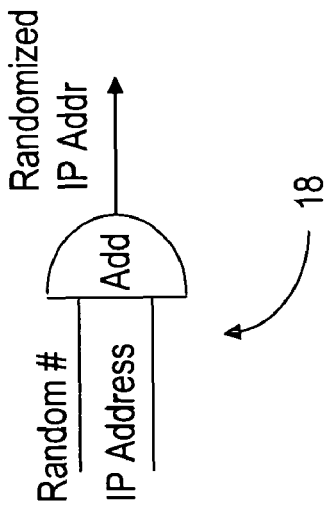
FIGS. 2a, 2b and 2c show additional randomization of the bits of the protocol data units (PDU) header performed for identifying a bucket associated with the respective PDU.
Figure 2B:
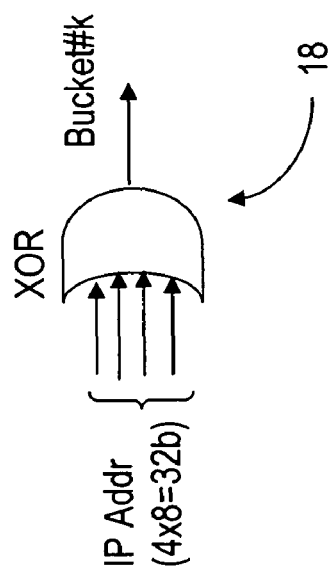
Figure 2C:
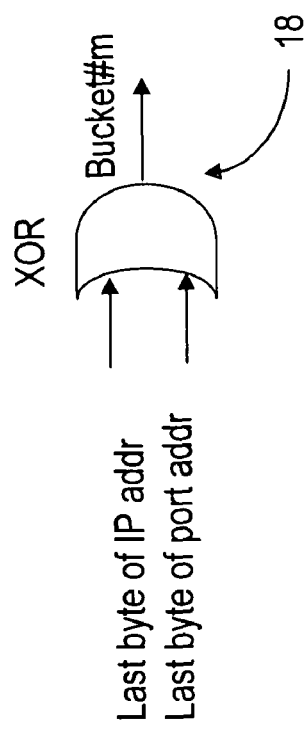

Certain countermeasures may be used with a view to address this situation. For example, the hash function may be designed so that addresses in the same subnet are likely to use different buckets (this is the "randomize" property that is expected from hash functions). XOR-ing the four address bytes together as shown in FIG. 2a will differentiate the sub-networks. XOR-ing the last byte of the IP address and the lower byte of the port number as shown in FIG. 2b will ensure that neither horizontal scanning (same port number, different IP address) nor vertical scanning (same IP address, different port) will end up in the same bucket. Another solution is to add a randomizer to the hash function, as shown in FIG. 2c. Thus, a random 32 bit number may be picked at boot time, and added to the IP address before doing the XOR. This preserves the sub-net scattering property above and is difficult for the attacker to stay in the same bucket. In general, selection of the function depends on the complexity of the attack detection desired.

As discussed above, each port or only some ports of interest may be equipped with the MDR system of the invention. It is to be noted that another advantage of the invention is that it is not necessary to synchronize the polling for all the ports of the NE; there is no harm in spreading out the polling. Depending on the platform, one easy way is to integrate the pooling of the counters with SNMP polls, which means checking the counters of a port as the SNMP for that port is processed. Also, realistically, there is no need for high precision in the polling interval so it can be done as a low priority task.

A "linear counting" function is preferably used for hashing the address data, as described by K-Y Whang et al. in the paper "A Linear-Time Probabilistic Counting Algorithm for Database Applications", which presents a thorough mathematical treatment of these counting techniques. This type of function has been selected because it is the most accurate of the whole family of probabilistic counting techniques. Whang et al. derive the best estimate of the actual linear count:

$$\hat{n} = -m^* \ln(z/m)$$

where m is the array size, z is the number of unset entries in the array, and n is the real count.

Whang et al. also derive the error estimate for this type of function as:

$$StdErr(\hat{n}/n) = \frac{\sqrt{m(\exp(t) - t - 1)}}{n}$$

where t is a load factor determined by the n/m ratio.

The paper also gives guidelines for obtaining a desired accuracy. If we apply the finding of this paper to the system of the invention, it is noted that the size of array 19 may be reduced significantly from the 256 bits discussed above, without a significant impact on the accuracy of malware detection. A smaller array is desirable in order to make the implementation easier in software. For the MDR system of the invention, if array 19 has four bytes (rather than a 256), the resulting accuracy is 17%. For a two byte array, the accuracy drops to 35%. This means even a very little memory space dedicated to the array still enables comprehensive results.

It is also possible to transfer relevant counts to an NMS/OSS to do long term (as in minute/hour) analysis to detect very low-rate stealth worms.

Some examples of how the MDR system of the invention operates are provided next.

Example 1

Let's assume that there is a TCP flash worm scanning the local sub-net by address. This will cause a large number of ARP requests, with a smaller number of ARP responses (basically, only the addresses with an actual host will respond). The ARP's that succeed will be followed by SYN packets trying to establish connections. Having in view that the limits are configurable, this kind of worms will be caught by any of:
 a. If countARP>100; this limit triggers if the subnet has too many addresses that are unused.
 b. If countSYN>100; this limits triggers if most the addresses are in use, so the worm will try to talk to them all
 c. If (countSYN−countSYNACK)/countSYN>0.15; this limit triggers when most of targets refuse to respond to the worm (since the worm is just blindly probing)
 d. If countSYNhosts>100; this limit triggers when the worm actually succeeds in finding and talking to a lot of hosts.

A UDP flash worm will be caught if it violates any of the limits for the corresponding UDP counters.

Example 2

Let's assume that a SYN flood attack originating from port 12. Any high intensity attack will be easily detected by the limits set for the SYN counter. Even low intensity attacks will be caught by a rule established for the difference between the number of SYN and SYN/ACK packets:
 (countSYN−countSYN/ACK)/countSYN

Example 3

A targeted worm, namely a worm that does not blindly scan addresses, but uses a contact book to get machine names, will be caught by any of:
 If countARP>100
 If countSYN>100
 If (countSYN−countSYNACK)/countSYN>0.15
 If countSYNhosts>100
 If countNameLookup>100

Example 4

Let's assume that a Smurf attack, is underway, i.e. an attack that sends many broadcast packet eliciting response packets to the originator, which is forged to be the victim's IP address, will be caught jf countBroadcast>100.

Figure 3:
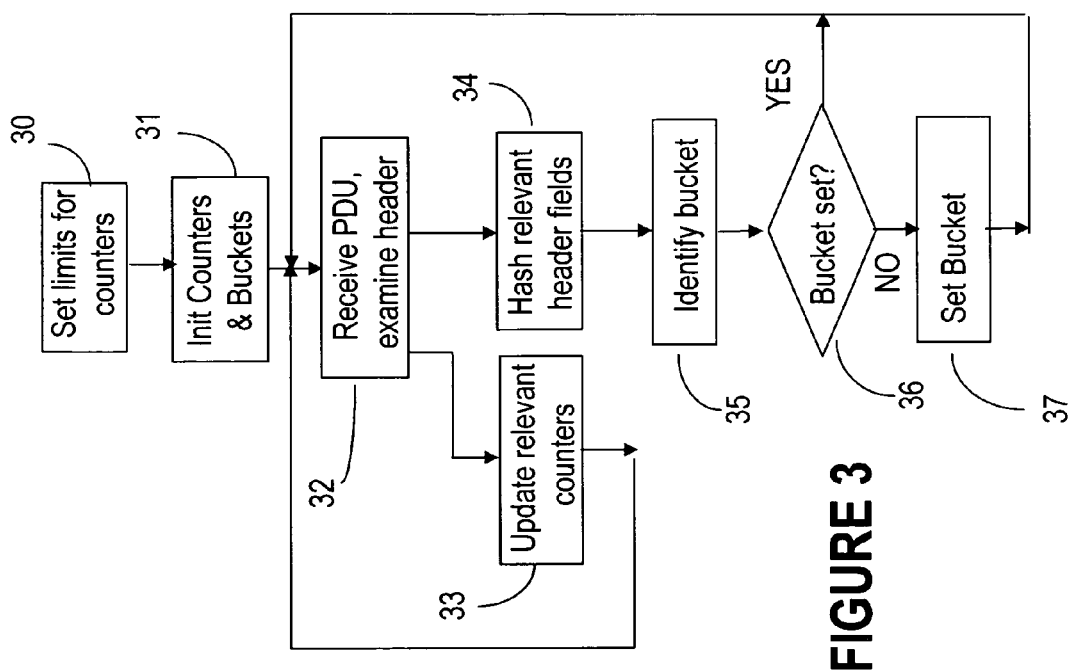
FIG. 3 illustrates a flow chart of the method of monitoring the traffic in the fast datapath.

FIG. 3 illustrates a flow chart of the method of monitoring the traffic in the fast datapath using MDR system 1. First, the limits are established in table 21, shown in step 30 and the counters and the bucket array are initialized, step 31. It is noted that all counters may be initialized at regular intervals of time, or may be initialized at the end of the respective time window. As well, the attack identification and containment unit may interpret the counts at regular intervals of time, after a certain number of time windows elapsed, etc; these are design implementations that can be executed in different ways, as well known.

The method involves then the following main steps, executed for each PDU received over the time window: in step 32, header data processing unit 14 monitors port 12 and examines the header of the PDU's received on that port; in step 33, the data in defined header fields is used to identify the type of PDU and to update the relevant counters. In the meantime, if the MDR system is provided with the complex counters unit 25, the relevant address data is hashed as shown in step 34 to identify a bucket corresponding to that hash value, step 35. If the bucket identified by the hash is not set, shown by the NO branch of decision block 36, it is set in step 37. If not, as seen by the YES branch of decision block 36, the bucket is left unchanged and the next packet is examined, etc. Note that for simplicity, only one hashing is shown; it is possible and sometimes desirable to use multiple hashings.

Figure 4:
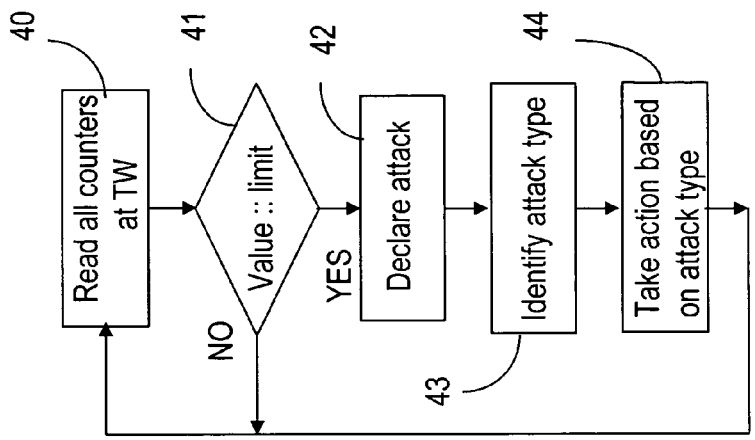
FIG. 4 shows a flowchart of the method of detecting an attack.

FIG. 4 shows a flowchart of the method of identifying an attack. After processing the packets received during TW as shown in FIG. 3, all counters are read, step 40; and the attack identification unit 23 compares the counter values against the limits in step 41; identifies in step 42 the limits that were crossed, if any; identifies the attack type in step 43 based on the counter or the combination of counters that violate/s the limit/s, and triggers in step 44 an appropriate defense action according to the rules that were violated.

We claim:

1. A malware detection and response system for a network element connected at an edge of a communication network, comprising:
 a header data processing unit for examining header data of each protocol data unit (PDU) seen on a port of said network element and identifying a PDU type;
 a counters unit for providing a plurality of count values for each traffic direction based on said identified PDU type, wherein the counters unit further comprises:
  a plurality of simple counters, each simple counter for maintaining an individual count value providing the number of PDUs of a specified PDU type seen on said port, for a respective traffic direction, and
  a complex counters unit for determining the number of far-end hosts that exchange PDUs over said port;
 a storage unit that stores a limits table setting a corresponding limit for each said count value and a rules set for defining attack patterns and containment actions for said port; and
 an attack identification and containment unit for identifying a type of attack by comparing the plurality of count values to corresponding limits in the limits table and correlating the comparison to the rules set, and for initiating a defense action for containing said type of attack.

2. The system of claim 1, wherein said complex counters unit further comprises, for each PDU type:
 outgoing complex counters for counting the number of far-end hosts that receive PDUs of said respective PDU type from said port and incoming complex counters for counting the number of far-end hosts that transmit PDUs of said respective PDU type to said port.

3. The system of claim 1, wherein said complex counters unit comprises:

a buckets array of a plurality of buckets, each bucket being associated with an address of at least one far end host;
a bucket selector for identifying address data of a PDU seen on said port and identifying a bucket corresponding to said address data and setting said bucket only if said bucket has not been previously set; and
a buckets counter for providing said count value indicative of a number of buckets set over a preset period of time.

4. The system of claim 1, further comprising:
a timing unit for associating a time window to each said counter.

5. The system of claim 1, wherein said counters unit includes one or more of Address Resolution Protocol (ARP) counters, Transmission Control Protocol (TCP) counters, Domain Name System (DNS) counters, User Datagram Protocol (UDP) counters and Internet Control Message Protocol (ICMP) counters.

6. The system of claim 1, wherein said attack identification and containment unit comprises:
an attack identification unit for identifying said type of attack using said limits table and said rules set; and
an attack containment unit for executing a defense action based on the type of attack identified by said attack identification unit.

7. A method for malware detection and containment for a port of a network element connected at the edge of a communication network, the method comprising: examining header data of each protocol data unit (PDU) seen on said port for determining a PDU type of each said PDU; maintaining for each traffic direction a plurality of counters for providing count values based on said PDU type, wherein the plurality of counters unit comprise: a plurality of simple counters, each simple counter for maintaining an individual count value providing the number of PDUs of a specified PDU type seen on said port, for a respective traffic direction, and a complex counters unit for determining the number of far-end hosts that exchange PDUs over said port; providing a limits table with preset limits corresponding to each count value and a rules set for defining attack patterns and containment action for said port; and identifying a type of attack by comparing the plurality of count values to corresponding limits in the limits table; and correlating the comparison to the rules set.

8. The method of claim 7, further comprising:
initiating a defense action for containing said type of attack.

9. The method of claim 7 wherein the maintaining step further comprises:
a) identifying, for each PDU, a counter that corresponds to said PDU type; and
b) updating the count value in said counter identified in step a).

10. The method of claim 7 wherein the identifying step further comprises:
detecting one or more crossed limits by comparing each count value with the corresponding limit in said limits table; and
identifying said type of attack based on said crossed limits and said rules set.

11. The method of claim 7 wherein the identifying step further comprises:
assigning a time window for each said counter;
processing a plurality of count values obtained for a PDU type into a composite count value;
detecting one or more crossed limits by comparing each count value and each composite count value with the corresponding limit in said limits table; and
identifying said type of attack based on said crossed limits and said rules set.

12. The method of claim 8, wherein said defense action further comprises:
shutting down said port;
slowing down said port; or
reporting said violation to a network operator.

13. The method of claim 7, wherein the maintaining step further comprises:
associating each bucket in a bucket array with an address of at least one far end host;
identifying address data for each said PDU seen on said port and calculating an index value from said address data;
setting a bucket corresponding to said index value identified in said PDU only if said bucket has not been previously set; and
providing said count value indicative of the number of buckets set over a preset period of time.

14. The method of claim 7, wherein said limits in said limit table are one of static limits, dynamic limits and statistically determined limits.

15. The method of claim 7, further comprising:
determining composite count values from the count values for specified PDU types;
detecting all crossed limits by comparing each count value and each composite count value with said corresponding limit in the limits table; and
identifying the type of attack based on the crossed limits and the rules set.

16. The method of claim 7, further comprising:
randomizing the address data to obtain an index value; and
identifying the bucket corresponding to the address data in the bucket array by using the index value.

17. The method of claim 16, further comprising:
applying a hash function to said address data.

18. The method of claim 17, further comprising:
processing the address data before applying the hash function.

* * * * *